(12) United States Patent
Ganesan et al.

(10) Patent No.: US 8,667,138 B2
(45) Date of Patent: Mar. 4, 2014

(54) DISTRIBUTED HIERARCHICAL RENDERING AND PROVISIONING OF CLOUD SERVICES

(75) Inventors: Ashok Ganesan, San Jose, CA (US); Ethan M. Spiegel, Mountain View, CA (US); Subrata Banerjee, Los Altos, CA (US); Sukhdev Kapur, Saratoga, CA (US); Joshua Merrill, Parker, CO (US); Michael Dvorkin, Redwood City, CA (US); Kaushik Narayan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

(21) Appl. No.: 12/915,531

(22) Filed: Oct. 29, 2010

(65) Prior Publication Data

US 2012/0110185 A1    May 3, 2012

(51) Int. Cl.
    *G06F 15/173*    (2006.01)
(52) U.S. Cl.
    USPC ........... 709/226; 709/203; 709/224; 709/229; 714/48; 718/104
(58) Field of Classification Search
    USPC .......... 709/223–224, 226, 203, 229; 714/100, 714/48; 718/104
    See application file for complete search history.

(56) References Cited

U.S. PATENT DOCUMENTS

| | | | |
|---|---|---|---|
| 7,200,589 B1 | 4/2007 | Graupner | |
| 7,457,835 B2 | 11/2008 | Toebes et al. | |
| 7,543,020 B2 | 6/2009 | Walker et al. | |
| 7,634,566 B2 | 12/2009 | Turner et al. | |
| 7,747,720 B2 | 6/2010 | Toebes et al. | |
| 7,752,311 B2 | 7/2010 | Walker et al. | |
| 7,870,420 B2 | 1/2011 | Lloyd et al. | |
| 8,255,529 B2 * | 8/2012 | Ferris et al. | 709/224 |
| 8,271,653 B2 * | 9/2012 | DeHaan | 709/226 |

(Continued)

FOREIGN PATENT DOCUMENTS

WO    2004110023 A1    12/2004

OTHER PUBLICATIONS

Nguyen Hoang et al., "Detecting Anomalies by Data Aggregation in the Power Grid", University of Illinois, Computer Science Research and Tech Reports, Jul. 2006, 10 pages.

(Continued)

*Primary Examiner* — Oanh Duong
(74) *Attorney, Agent, or Firm* — Edell, Shapiro & Finnan, LLC

(57) ABSTRACT

Techniques are provided herein for distributed and hierarchical rendering and provisioning of cloud services. At a device in a cloud computing system comprising a plurality of hierarchical levels, a cloud service request is received for rendering and provisioning of a virtual data center. A determination is made as to which aspects of the cloud service request are to be satisfied by devices in a first hierarchical level and which aspects of the cloud service request are to be satisfied by devices in a second hierarchical level and in subsequent hierarchical levels. Rendering and provisioning commands are provided to one or more devices in the first hierarchical level that are selected to satisfy aspects of the cloud service request in the first hierarchical level. A subset cloud service request for aspects of the cloud service request that are to be satisfied by devices in the second hierarchical level is sent to a device in the second hierarchical level.

22 Claims, 10 Drawing Sheets

(56) References Cited

U.S. PATENT DOCUMENTS

| | | |
|---|---|---|
| 2005/0283645 A1 | 12/2005 | Turner et al. |
| 2006/0179106 A1 | 8/2006 | Turner et al. |
| 2008/0238919 A1* | 10/2008 | Pack .............................. 345/420 |
| 2008/0256549 A1 | 10/2008 | Liu et al. |
| 2009/0287825 A1 | 11/2009 | Walker et al. |
| 2010/0223378 A1 | 9/2010 | Wei |
| 2010/0223382 A1 | 9/2010 | Rayes et al. |
| 2010/0228819 A1 | 9/2010 | Wei |
| 2010/0250668 A1 | 9/2010 | Toebes et al. |
| 2010/0287280 A1 | 11/2010 | Sivan |
| 2011/0022642 A1 | 1/2011 | deMilo et al. |
| 2011/0066728 A1 | 3/2011 | Gauthier et al. |
| 2011/0126197 A1* | 5/2011 | Larsen et al. ...................... 718/1 |
| 2011/0137805 A1 | 6/2011 | Brookbanks et al. |
| 2011/0138050 A1* | 6/2011 | Dawson et al. ............... 709/226 |
| 2011/0145439 A1* | 6/2011 | Chaturvedi et al. ........... 709/244 |
| 2011/0179132 A1* | 7/2011 | Mayo et al. .................... 709/213 |
| 2011/0295998 A1* | 12/2011 | Ferris et al. .................... 709/224 |
| 2011/0320605 A1* | 12/2011 | Kramer et al. ................ 709/226 |
| 2012/0005236 A1* | 1/2012 | Deng et al. ..................... 707/798 |
| 2012/0030343 A1 | 2/2012 | Ryder |
| 2012/0054332 A1* | 3/2012 | Sahu et al. ..................... 709/224 |
| 2012/0054345 A1* | 3/2012 | Sahu et al. ..................... 709/226 |
| 2012/0054626 A1* | 3/2012 | Odenheimer ................. 715/738 |
| 2012/0060165 A1* | 3/2012 | Clarke ........................... 718/104 |
| 2012/0311144 A1* | 12/2012 | Akelbein et al. .............. 709/224 |
| 2013/0138619 A1* | 5/2013 | Krislov .......................... 707/695 |

OTHER PUBLICATIONS

Rich Miller, "Can Amazon be a Player in Disaster Recovery?", Data Center Knowledge, Mar. 12, 2009, pp. 1-8.

Rich Miller, "How Google Routes Around Outages", Data Center Knowledge, Mar. 25 2009, pp. 1-12.

* cited by examiner

DISTRIBUTED HIERARCHICAL RENDERING AND PROVISIONING OF CLOUD SERVICES

TECHNICAL FIELD

The present disclosure relates to cloud computing systems and to techniques for rendering and provisioning cloud services in a cloud computing system.

BACKGROUND

In a cloud computing environment, numerous cloud service requests are serviced in relatively short periods of time. In such an environment, it is highly beneficial to automate placement, rendering, and provisioning of cloud services within and between data centers, so that cloud service requests can be accommodated dynamically with minimal (and preferably no) human intervention.

Examples of cloud services include: compute services, network services, and storage services. Examples of network services include Layer 2 (L2) virtual local area network (VLAN) or Layer 3 (L3) virtual routing and forwarding (VRF) connectivity between various physical and logical elements in a data center, Layer 4 (L4) to Layer 7 (L7) services including firewalls and load balancers, Quality of Service (QoS), access control lists (ACLs), and accounting.

Network management of cloud computing systems currently use orchestration tools which learn about all cloud elements within the data center, make all placement decisions for all cloud elements within the data center, and render and provision the cloud service request by communicating directly with each cloud element in the data center. Due to the wide variety of functionality and implementations within the data center, such orchestration tools need to be highly customizable and flexible so that they can utilize the wide array of management interfaces provided by various cloud elements. Considerable effort is required to make the orchestration tools properly interface with new implementations of cloud elements within the data center, leading to significant time delays before new features provided by the cloud elements can be managed by the orchestration tools. These orchestration tools have great difficulty scaling to large cloud environments.

DESCRIPTION OF EXAMPLE EMBODIMENTS

Overview

Techniques are provided herein for distributed hierarchical rendering and provisioning of cloud services. At a device in a cloud computing system comprising a plurality of hierarchical levels, a cloud service request is received for rendering and provisioning of a virtual data center. A determination is made as to which aspects of the cloud service request are to be satisfied by devices in a first hierarchical level and which aspects of the cloud service request are to be satisfied by devices in a second hierarchical level and in subsequent hierarchical levels. Rendering and provisioning commands are provided to one or more devices in the first hierarchical level that are selected to satisfy aspects of the cloud service request in the first hierarchical level. A subset cloud service request for aspects of the cloud service request that are to be satisfied by devices in the second hierarchical level is sent to a device in the second hierarchical level.

Example Embodiments

Figure 1:
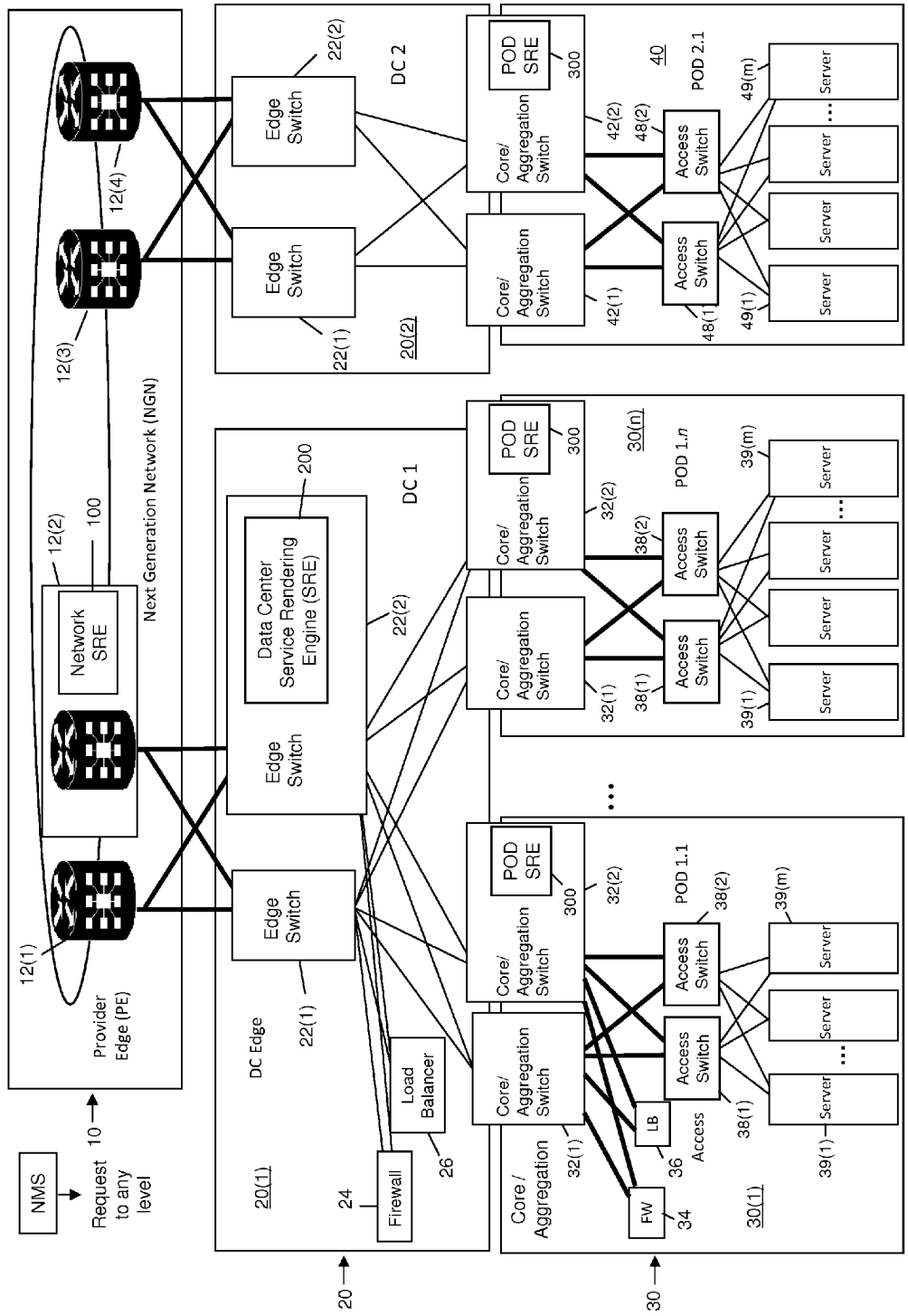
FIG. 1 is an example of a block diagram of a cloud computing system employing distributed hierarchical rendering and provisioning of cloud services.

Referring first to FIG. 1, an example of a cloud computing system or environment is shown at 5. The system is configured with a distributed hierarchical mechanism for servicing policy-based cloud service requests. The system 5 comprises a plurality of hierarchical levels. The highest level is a network level 10, also referred to herein as a Next Generation Network (NGN) level. The next highest level is a data center (DC) level 20. Beneath the data center level 20 is a POD level 30. While FIG. 1 shows three levels in the hierarchy, this is only an example, as there may be additional levels. There are cloud elements in each hierarchical level. The cloud elements may comprise switches, routers, load balancers, firewalls, servers, network appliance or any device that is involved in providing a function to a cloud service request. For simplicity, the term "cloud element" is meant to encompass any of these devices.

The policy-based cloud service requests progress through a set of distributed hierarchical service rendering engines (SREs). The network level 10 connects multiple different data centers at the data center level 20, e.g., data center 20(1) labeled as DC 1 and data center 20(2) labeled as DC 2, and subsets of the data centers called "PODs" that are centered on aggregation switches within the data center. Again, the number of levels shown in FIG. 1 is an example. It is possible to deploy an arbitrary number of levels of hierarchy, possibly with different definitions than in this example. The hierarchy may follow the physical topology of the network but it is not required.

At each level of the hierarchy, there is at least one service rendering engine. In the network level 10, there are Provider Edge (PE) devices that perform routing and switching functions. FIG. 1 shows four PE devices 12(1)-12(4) as an example. A network service rendering engine is shown at 100 as part of the PE 12(2). At the data center level 20, there are edge switches, firewalls and load balancers. For example, in a first data center 20(1) labeled "DC 1" in FIG. 1, there are edge switches 22(1) and 22(2), a firewall device 24 and a load balancer device 26. The PEs 12(1) and 12(2) in the network level 10 are each connected to the edge switches 22(1) and 22(2). A data center service rendering engine (SRE) 200 is part of the edge switch 22(2) in data center 20(1). The data center SRE 300 may be hosted in other networking elements in the data center or in one or more virtual machines running on servers in the data center. In another form, the data center SRE functionality may be distributed across multiple devices in the POD. The edge switches 22(1) and 22(2) are each connected to the firewall device 24 and load balancer device 26. Similarly, in data center 20(2), there are edge switches 22(1) and 22(2), and also a firewall device and a load balancer device. The firewall and load balancer devices in data center 20(2) are not shown in FIG. 1 for simplicity. Switch 22(2) in data center 20(2) includes a data center service rendering engine 200 as well.

At the POD level 30, there are core/aggregation switches, firewalls, load balancers and web/application servers in each POD. The functions of the firewalls, load balancers, etc., may be hosted in a physical chassis or they may be hosted in a virtual machine executed on a computing element in the POD level 30. PODs 30(1)-30(n), labeled "POD 1.1"-"POD 1.n", are connected to data center 20(1) and POD 40 is connected to data center 20(2). Thus, PODs 30(1)-30(n) may be viewed as different processing domains with respect to the data center 20(1), and the data center service rendering engine 200 in the edge switch 22(2) may select which one (or more) of a plurality of processing domains in the POD level to be used for aspects of a cloud service request that the data center service rendering engine 200 receives. Data center 20(2) cannot select one of the PODs 30(1)-30(n) because they are in different processing domains, but data center 20(2) can select POD 40. In each of PODs 30(1)-30(n), there are core/aggregation switches 32(1) and 32(2), one or more firewall (FW) devices 34, one or more load balancer (LB) devices 36, access switches 38(1) and 38(2) and servers 39(1)-39(m). The firewall and load balancers are not shown in POD 30(n) for simplicity. The servers 39(1)-39(m) each runs one or more virtual machine processes, i.e., virtual servers. There is a POD SRE 300 in core/aggregation switch 32(2) in each of PODs 30(1)-30(n). The POD SRE 300 may be hosted in other networking elements in the POD or in one or more virtual machines running on servers in the POD. In another form, the POD SRE functionality may be distributed across multiple devices in the POD. Similarly, in POD 40 there are core/aggregation switches 42(1) and 42(2), access switches 48(1) and 48(2) and servers 49(1)-49(m). There is a POD service rendering engine 300 in core/aggregation switch 42(2). POD 40 also includes one or more firewalls and load balancers but they are omitted in FIG. 1 for simplicity.

Network management stations/orchestration tools external to the cloud computing system 5 transmit policy-based cloud service requests to one or more service rendering engines. That service rendering engine is responsible for all interactions with the external network management stations/orchestration tools regarding that cloud service request. An example of an external network management station (NMS) is shown at 50 in FIG. 1. The NMS 50 may transmit a request to any level of the hierarchy of the cloud computing system 5. The cloud service request is handled from that level downward or from that level upward in the hierarchy. For example, if the network management station chooses to interact with service rendering engines at the data center level 10, then the network will handle placement decisions, rendering, and provisioning throughout the data center level 20 and POD level 30. In this case, the NMS 50 separately handles network level placement decisions (e.g., selection of the data center) and rendering and provisioning, e.g., virtual private network (VPN) extension to the selected data center.

The service rendering engine for any given hierarchical level is responsible for making placement decisions, rendering, and provisioning within its domain in its hierarchical level. This includes selection of one or more child domains in the next child (lower) hierarchical level for placement of cloud services or selection of one or more parent domains in the next parent (higher) hierarchical level for placement of cloud services, but does not include (knowledge of) details of placement, rendering, and provisioning within the child domain (or in the parent domain). Additional service rendering engines may be enabled in order to provide high availability and possibly in order to distribute processing load. In an active/standby approach, there is more than one service rendering engine for a particular domain and one of the service rendering engines is considered active and receives and responds to policy-based cloud service requests. The active service rendering engine checkpoints, i.e., registers, its state to any standby service rendering engines for the same domain. If the active service rendering engine goes down, then a standby service rendering engine will statefully transition to the active role and quickly resume processing of policy-based cloud service requests. In another approach, multiple service rendering engines for the same domain share a common distributed database containing all state information related to policy-based cloud service requests. This approach allows for policy-based cloud service requests to be load balanced across the multiple service rendering engines.

The cloud computing system 5 may be configured to employ recursive abstraction and normalization with respect to service rendering and placement mechanisms. At a bottom level of the hierarchy, there is collection of devices that comprises the POD. At the next level up, the POD is treated as if it were one device, like one large computer with numerous capabilities.

There are a plurality of layers of abstraction, a placement mechanism that takes place in each layer, policy elements, and interpretation of policy. Each layer provides abstraction and normalization with respect to service rendering and placement mechanisms. In other words, the determination as to where to place a cloud service request is based on normalized information representing capabilities of devices in a given hierarchical (e.g., first level) and another (e.g., second) hierarchical level.

Each layer can be non-homogeneous. For example, each layer can have its own policy rendering mechanism and its own placement mechanisms that apply to the level of abstraction provided by the immediate underlying layer. At each layer, the placement decisions are based on normalized information from a layer below. Once placed at the layer below, similar operations are performed at the layer below. Thus, this process is recursive from layer to layer, but within a given layer, the rendering and provisioning mechanisms may be different from each other.

Figure 2:
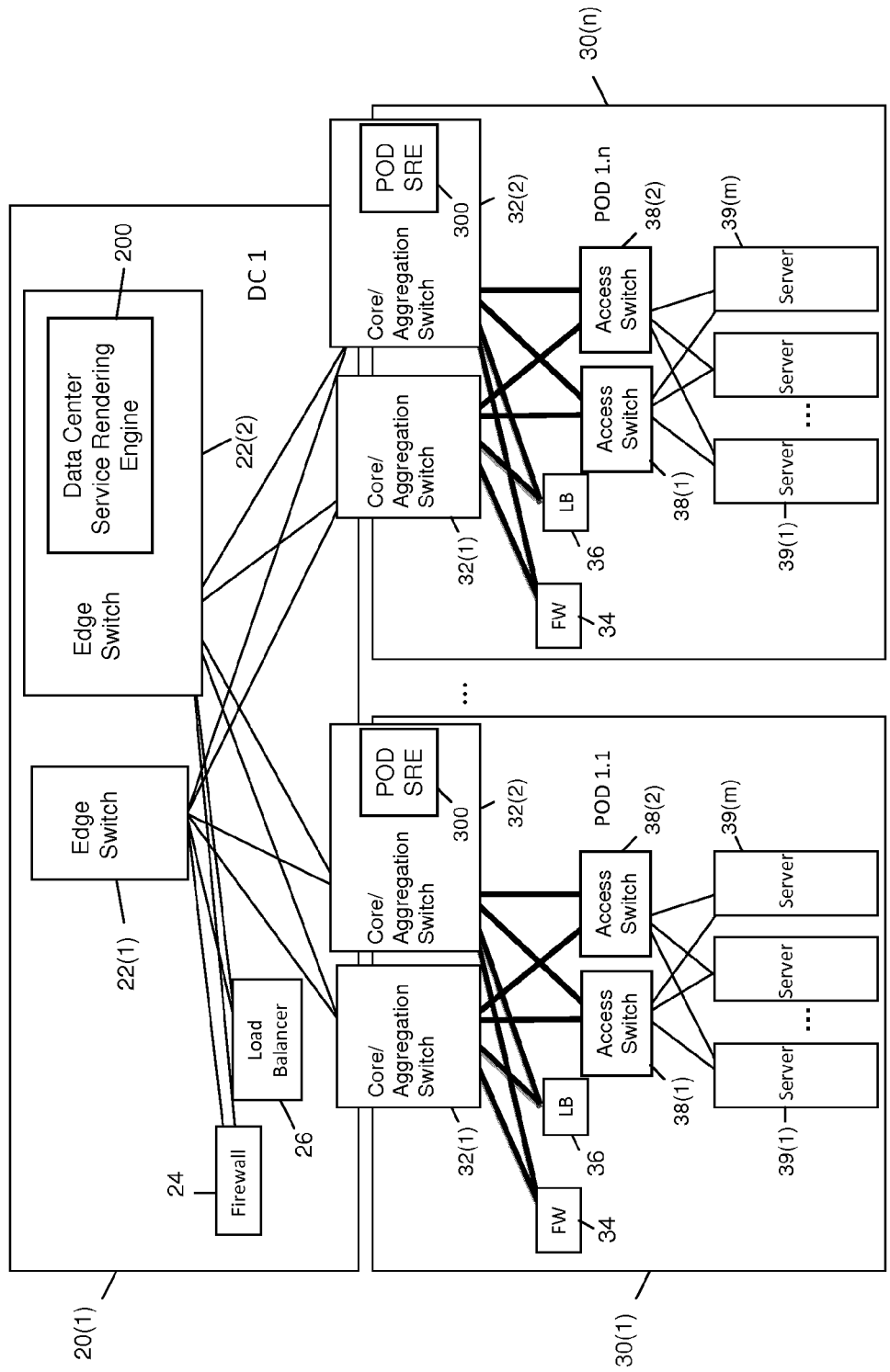
FIG. 2 is an example of a diagram depicting a network view from the perspective of a service rendering engine in a data center hierarchical level.

The network view from the perspective of a data center service rendering engine is shown in FIG. 2, for example with respect to the data center service rendering engine 200 in edge switch 22(2) of data center 20(1). Based on the details of the policy-based cloud service request and the data center service rendering engine's knowledge of the data center domain topology, capabilities, and resources, the data center service rendering engine 200 makes a placement decision. The data center service rendering engine 200 determines that some aspects of the cloud service request are to be satisfied at the data center level, for example utilizing a firewall hanging off a data center edge switch. These aspects are rendered and provisioned by the data center service rendering engine 200 in cooperation with the cloud elements within the data center domain. The remaining aspects of the cloud service request are placed in one or more specific PODs, though the data center service rendering engine 200 does not placed them in specific cloud elements within the POD. The data center service rendering engine 200 passes the policy-based service request to the POD service rendering engines 300 for the selected PODs, for placement, rendering, and provisioning within those PODs. The policy-based request is either filtered before forwarding, or is marked so that the portions of the policy-based cloud service request relevant to the specific POD can be identified. In other words, the forwarded cloud service request is a subset of the original cloud service request, either by way of filtering or by way of marking/indicating those portions of the original request that are relevant to the POD service rendering engine 300 that receives it. The DC-level SRE may also add policies to the request that the DC-level SRE wants the POD level SRE to help enforce even though it may not be part of the original policy-based cloud service request.

The terminology "aspects of the cloud service request" refers to features or functions of one or more cloud elements to support or implement the virtual data center functionality of the cloud service request. A virtual data center refers to functions of the cloud computing system invoked to simulate or virtualize a data center on behalf of a requesting entity.

Figure 3:
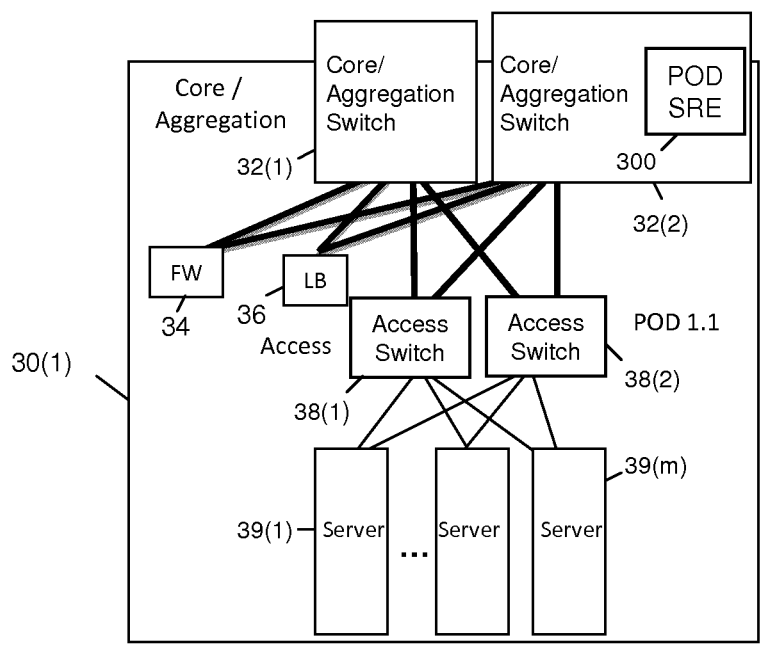
FIG. 3 is an example of a diagram depicting a network view from the perspective of a service rendering engine in a POD hierarchical level.

The network view from the perspective of the POD service rendering engine 300 of POD 30(1) is shown in FIG. 3. The POD service rendering engine 300 is responsible for placing the remainder of the policy-based cloud service request in specific cloud elements within the POD, and rendering and provisioning the cloud service across those elements.

Figure 4:
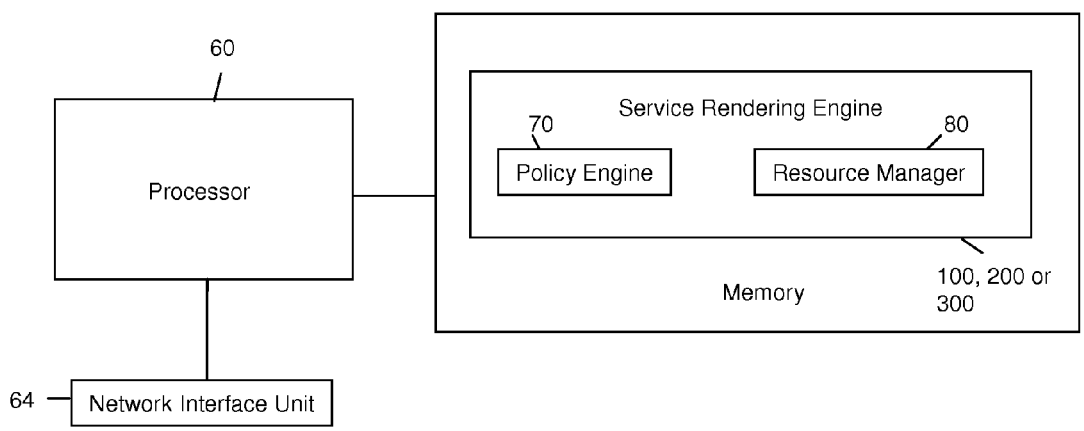
FIG. 4 is an example of a block diagram of a device, such as a switch, that is configured to perform service rendering engine operations as part of the distributed hierarchical rendering and provisioning of cloud services techniques.

Referring now to FIG. 4, an example of a block diagram of a device that is configured with a service rendering engine is now described. This device may be a processing element 12(1)-12(4) in the network level 10, an edge switch, e.g., edge switches 22(1) and/or 22(2) in data centers 20(1) and 20(2), core/aggregation switch, e.g., core/aggregation switches 32(1) and/or 32(2) in PODs 30(1)-30(n) and core/aggregation switches 42(1) and/or 42(2) in POD 40, or any network appliance device that is capable of communicating with other elements in a given hierarchical level. In the device, there is a processor 60, a memory 62 and a network interface unit 64. The memory 62 stores instructions for a service rendering engine. When the device is configured to be deployed in the network level, the instructions stored in the memory 62 are for a network service rendering engine 100. When the device is configured to be deployed in a data center, the instructions stored in the memory 62 are for a data center service rendering engine 200. When the device is configured to be deployed in a POD, the instructions stored in the memory 62 are for a POD service rendering engine 300. A service rendering engine 100, 200 and 300 includes instructions for a policy engine 70 and a resource manager 80, which are described further hereinafter. The network interface unit 64 is configured to perform communications (transmit and receive) over a network in order to communicate with other cloud elements and their embedded service rendering engine or abstract device broker.

Figure 5:
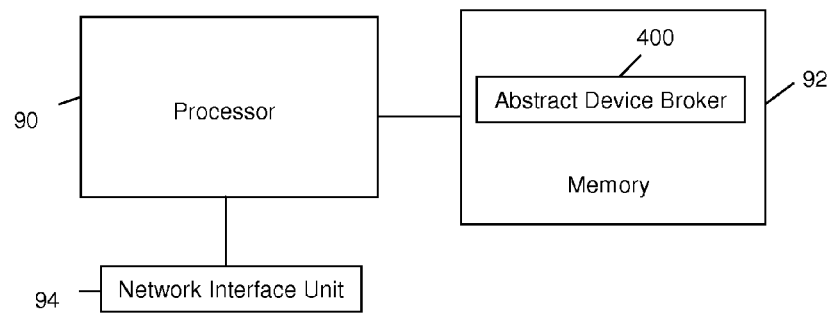
FIG. 5 is an example of a block diagram of a device that is configured to perform abstract device broker operations as part of the distributed hierarchical rendering and provisioning of cloud services techniques.

FIG. 5 shows an example of a block diagram of an element that resides in the cloud computing system 5 that is configured to respond to commands from a service rendering engine. Thus, FIG. 5 shows a simplified block diagram of what is referred to herein as a "cloud element". The cloud element comprises a processor 90, memory 92 and network interface device 94. The memory 92 stores instructions for an abstract device broker 400. The network interface 94 is configured to perform communications (transmit and receive) over a network in order to communicate with other cloud elements and their embedded service rendering engine.

The memory 62 and memory 92 shown in FIGS. 4 and 5 is, for example, random access memory (RAM), but may comprise electrically erasable programmable read only memory (EEPROM) or other computer-readable memory in which computer software may be stored or encoded for execution by the processor 60 and 90, respectively. The processors 60 and 70 shown in FIGS. 4 and 5 are configured to execute instructions stored in their associated memories for carrying out the techniques described herein. In particular, the processor 60 is configured to execute program logic instructions (i.e., software) stored or encoded in memory 62 for service rendering engine 100 comprising the policy engine 70 and resource manager 80. Similarly, the processor 90 is configured to execute program logic instructions (i.e., software) or encoded in memory 92 for the policy agent 400.

The operations of processors 60 and 90 may be implemented by logic encoded in one or more tangible media (e.g., embedded logic such as an application specific integrated circuit, digital signal processor instructions, software that is executed by a processor, etc). The service rendering engine 100 may take any of a variety of forms, so as to be encoded in one or more tangible media for execution, such as fixed logic or programmable logic (e.g. software/computer instructions executed by a processor) and the processor 60 may be an application specific integrated circuit (ASIC) that comprises fixed digital logic, or a combination thereof. For example, the processor 60 may be embodied by digital logic gates in a fixed or programmable digital logic integrated circuit, which digital logic gates are configured to perform the operations of the service rendering engine 100. In one form, the service rendering engine 100 is embodied in a processor or computer-readable memory medium (memory 62) that is encoded with instructions for execution by a processor (e.g. a processor 60) that, when executed by the processor, are operable to cause the processor to perform the operations described herein in connection with service rendering engine 100. Similar configurations are also possible for the processor 90 and the policy agent 400 stored in memory 92.

Policy rendering and provisioning is accomplished by communicating applicable subsets of the policy-based cloud service request from service rendering engines to cloud elements. Within each cloud element, the policy agent is responsible for receiving the policy subsets and converting the policy-based information into that cloud element's internal configuration to perform the desired function in that cloud element. This takes the place of traditional network management configuration interfaces, relieving the service rendering engines from the task of policy transformation into various configuration interfaces and models.

Figure 6:
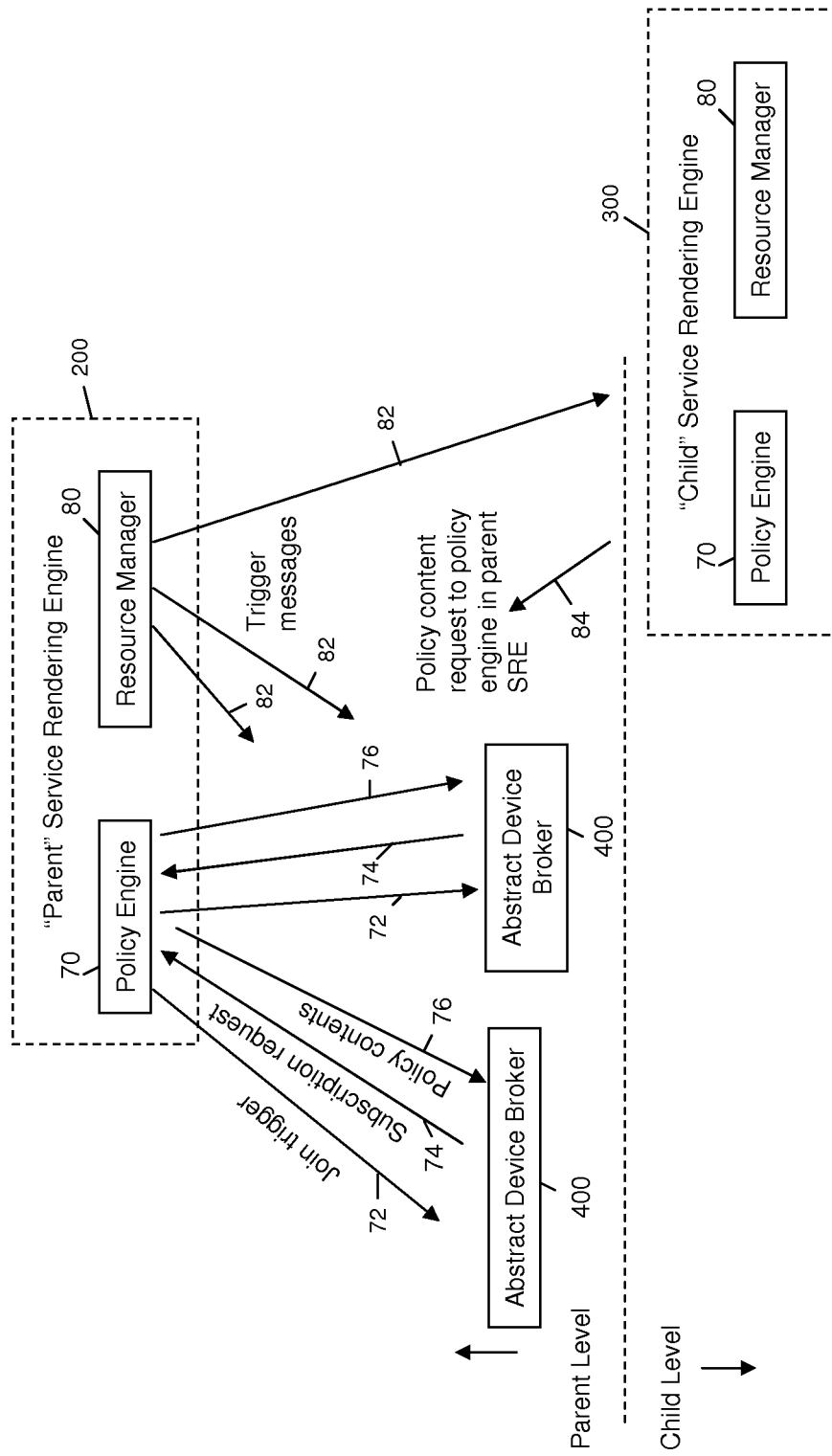
FIG. 6 is a diagram that shows an example of interactions between a parent service rendering engine and abstract device brokers in cloud elements in the parent level, and between the parent service rendering engine and a child service rendering engine.

Reference is now made to FIG. 6. In one implementation, abstract device brokers 400 are first triggered to join in a particular instantiation of cloud services by the service rendering engine 200 for that hierarchical level. This is shown by the arrows 72 in FIG. 6. The abstract device brokers 400 then subscribe to the policy for that set of cloud services by sending a subscription request shown at arrows 74 to the policy engine 70. Initially, this causes the policy engine 70 to push the relevant policy to the policy agent as the subscriber. Subsequently, whenever the subscribed policy is modified explicitly or implicitly, the policy engine 70 pushes the modified policy information to all abstract device brokers that have subscribed to that particular policy. One specific method for implementation of publish/subscribe functionality for policy acquisition by abstract device brokers involves the use of the eXtensible Messaging and Presence Protocol (XMPP).

The resource manager 80 makes the placement decision and triggers the policy agent in a cloud element or the resource manager 80 in a child service rendering engine, informing them that they have been selected to satisfy a policy-based cloud service request. The trigger message, shown at 82 in FIG. 6, includes an identification of the corresponding policy. At 84, the abstract device brokers 400 and/or resource manager 80 in the child service rendering engine 300 then request the policy contents from the policy engine 70 within the parent service rendering engine 200, which responds to the requests with the policy contents as shown at 76 in FIG. 6.

The policy subset represents rendering and provisioning commands or information for a given policy agent in a given cloud element. When a service rendering engine sends rendering and provisioning commands to a policy agent, it sends rendering and provisioning subset information derived from a received cloud service request. The rendering and provisioning subset information comprises information that enables a policy agent to configure one or more functions of the device that receives the information. The rendering and provisioning subset information is different depending on the nature and general function of the device, i.e., firewall, load balancer, access switch, server, edge switch, core/aggregation switch, etc., and the function that the device is to perform in order to satisfy the overall virtual data center to be established according to the cloud service request.

Figure 7:
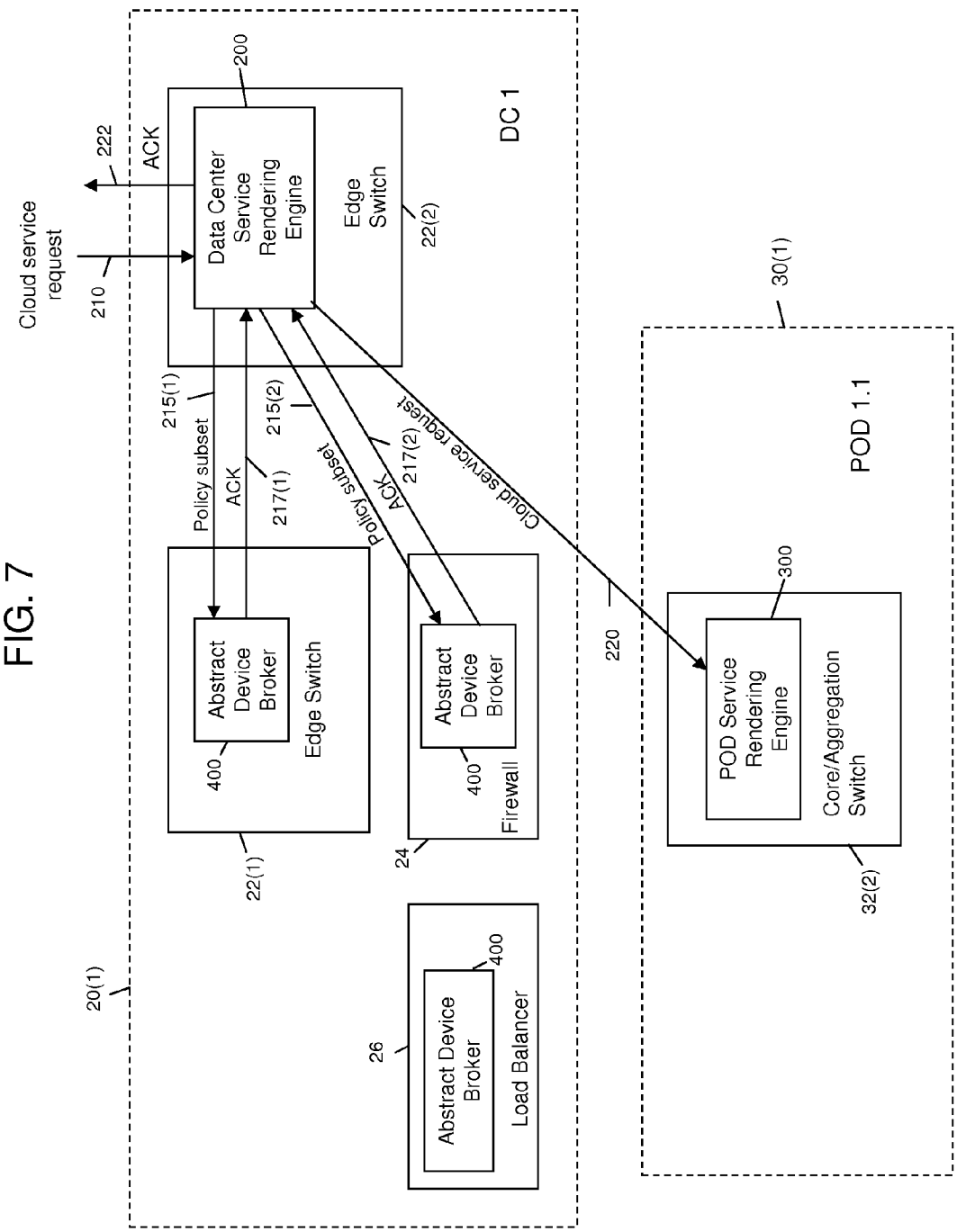
FIGS. 7 and 8 depict an example of "top down" control signaling between a data center service rendering engine and a POD service rendering engine.
Figure 8:
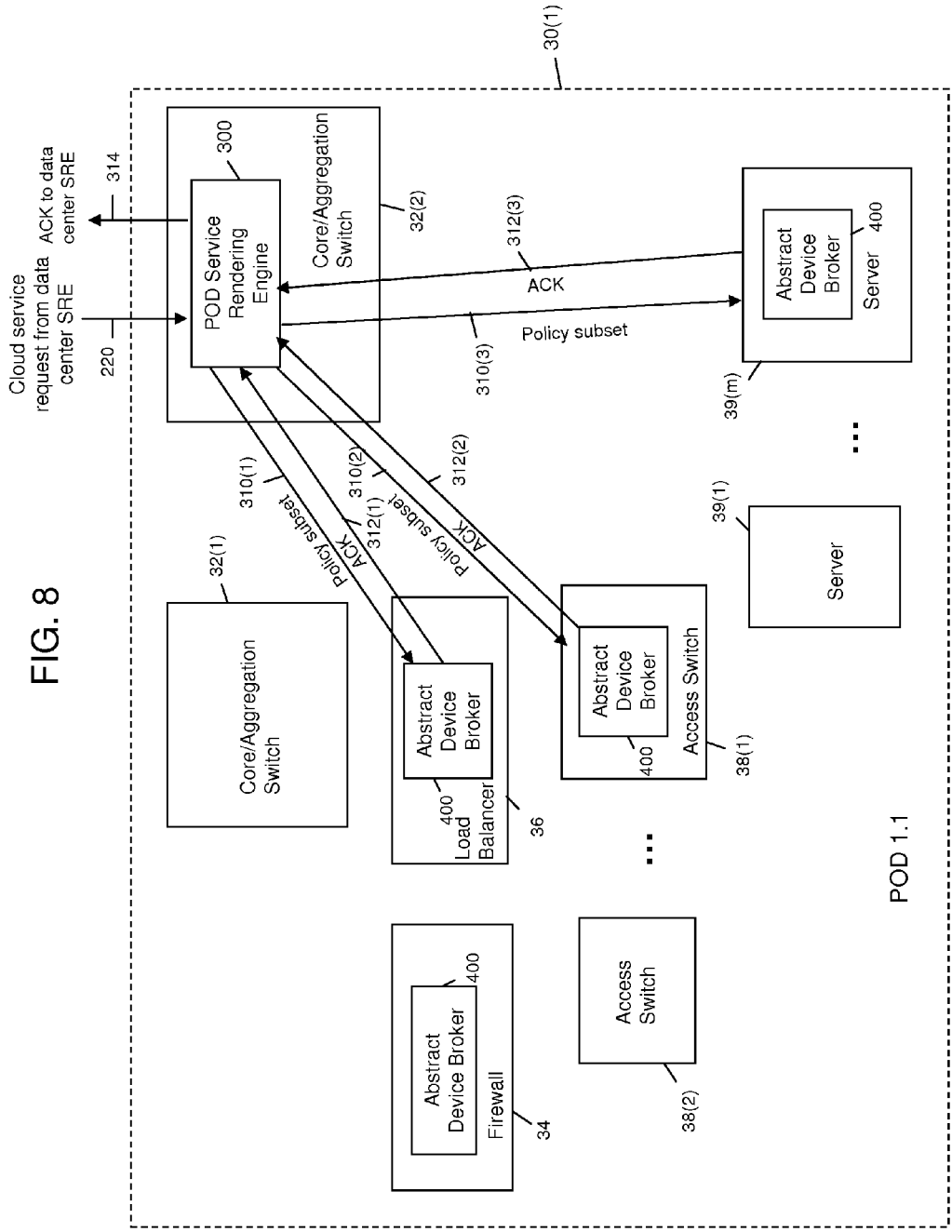

Reference is now made to FIGS. 7 and 8. These figures show a "top down", also called "early bound", flow for establishment of a virtual data center in response to a policy-based cloud service request. In the "early bound" or "top down" flow, rendering and provisioning of the virtual data centers proceeds in a top down fashion. A policy-based cloud service request is received at a higher level domain that makes placement decisions and renders and provisions the virtual data center throughout its domain before passing the policy-based cloud service request to a child domain. In the following descriptions of FIGS. 7-10, operations with reference numerals in the 200's are operations of a data center service rendering engine 200 and operations with reference numerals in the 300's are operations of a POD service rendering engine 300. Moreover, operations with reference numerals in the 400's are operations of a policy agent 400.

At 210, a policy-based cloud service request is received by the data center service rendering engine 200. This request may originate from the NMS 50 shown in FIG. 1, for example. The data center service rendering engine 200 makes a placement decision, determining which POD or PODs the virtual data center should be established in, and also determining which aspects of the cloud service request may be satisfied in the data center level itself. In the example shown in FIG. 7, the data center service rendering engine 200 selects a data center edge switch 22(1) to provide connectivity for the virtual data center being established, and selects a firewall device 24 hanging off that data center edge switch 22(1). When the data center service rendering engine makes the determination as to which aspects of the cloud service request are to be satisfied by cloud elements in the POD hierarchical level, it does so without knowledge of details of the placement, rendering and provisioning of cloud elements in the POD hierarchical level. The data center service rendering engine 200 leaves those POD level details to the POD service rendering engine 300 as described hereinafter.

At 215(1) and 215(2), the data center service rendering engine 200 communicates with the abstract device brokers 400 for all selected cloud elements, e.g., edge switch 22(1) and firewall device 24, within the data center domain in order to provide these cloud elements with the applicable policy rendering and provisioning subset information. At 217(1) and 217(2), the abstract device brokers 400 within the data center domain acknowledge receipt of the policy subsets to the data center service rendering engine 200.

At 220, the data center service rendering engine 200 progresses the policy-based cloud service request to the POD service rendering engine 300 for the selected POD, shown as POD 30(1) in this example. Again, the data center service rendering engine 200 may have multiple processing domains (e.g., PODs) to choose from and it selects one or more of these processing domains depending on the nature of the cloud service request. The cloud service request sent at 220 from the data center service rendering engine 200 to the POD service rendering engine 300 is a subset of the cloud service request received at 210 at the data center service rendering engine 200 because the cloud service request sent at 220 consists of those aspect of the cloud service request at 210 that the data center service rendering engine 200 determines to be satisfied by cloud elements in the POD hierarchical level 30 rather than in the data center hierarchical level 20. The subset cloud service request may be a filtered or marked version of the original cloud service request, as explained above.

Reference is now made to FIG. 8 for the rest of the "top down" flow. In response to receiving the policy-based (subset) cloud service request from the data center service rendering engine at 220, the POD service rendering engine 300 makes a placement decision, determining which cloud elements within the POD domain should be used to establish the requested virtual data center. In this example, the POD service rendering engine 300 selects a load balancer 36, an access switch 38(1), and a server 39(m). Thus, the POD service rendering engine 300 selects one or more cloud elements in its domain (in the POD hierarchical level) to satisfy the (subset) cloud service request received at 220.

At 310(1)-310(3), the POD service rendering engine communicates with the abstract device brokers for all selected cloud elements within the POD domain in order to provide each such cloud element with the applicable rendering and provisioning commands, e.g., rendering and provisioning policy subset information derived from the subset cloud service request at 220. At 312(1)-312(3), the abstract device brokers within the POD domain acknowledge (ACK) receipt of the policy subsets to the POD service rendering engine 300.

In response to receiving acknowledgments from the POD elements 36, 38(1) and 39(1), at 314 the POD service rendering engine 300 sends an acknowledgement to the data center service rendering engine 200.

Referring back to FIG. 7, at 222, the data center service rendering engine 200 sends an acknowledgement to the network management station that sent the initial policy-based cloud service request at 210. In one implementation, operations 215(1)-215(3) and 310(1)-310(3) may involve a handshake rather than a unidirectional message containing the applicable policy subset.

Figure 9:
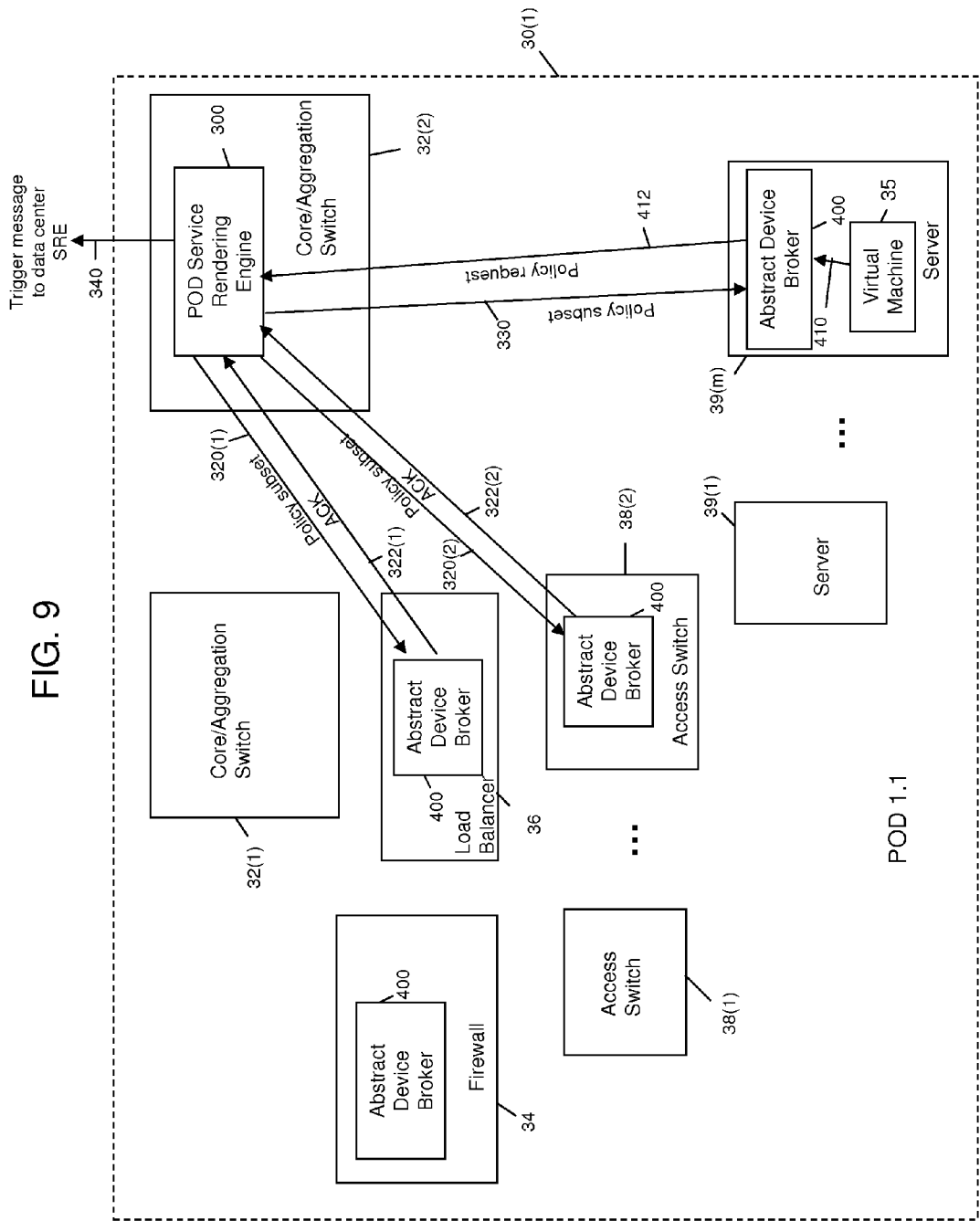
FIGS. 9 and 10 depict an example of "bottom up" control signaling between a POD service rendering engine and a data center service rendering engine.
Figure 10:
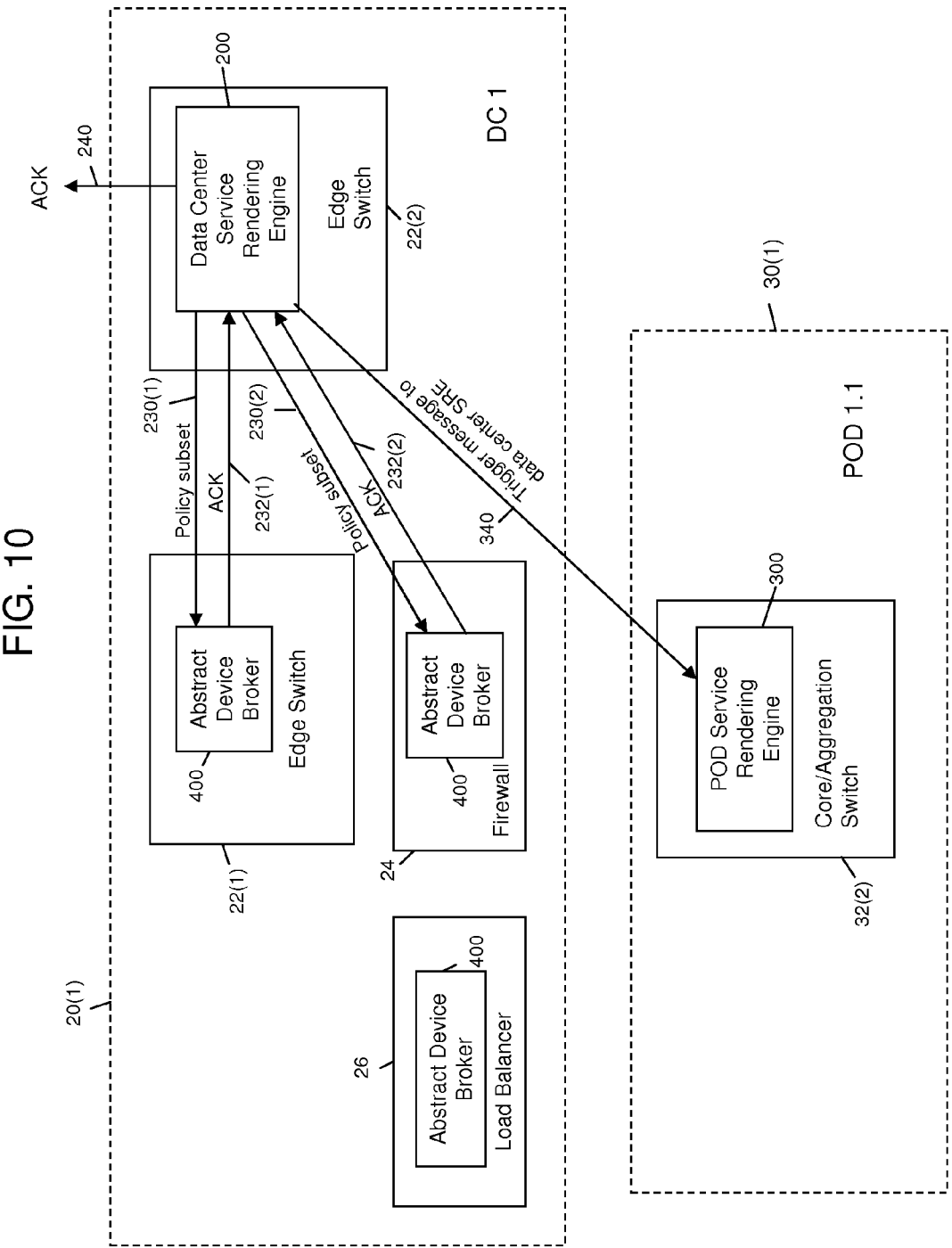

Reference is now made to FIGS. 9 and 10 for a description of a "late bound" or "bottom up" flow for rendering and provisioning of the virtual data center. In the "late bound" or "bottom up" flow, rendering and provisioning of the virtual data center are delayed so that they do not occur in direct response to the policy-based cloud service request, but instead they proceed in a bottom up fashion. Some time after receipt of the policy-based cloud service request, a virtual machine comes up in a server in one of the lowest levels. This triggers a notification to the policy agent in that server, e.g., server 39(m).

At 410, a policy agent in a server in POD 30(1), e.g., server 39(m), detects that a virtual machine 35 comes up (goes active) on the server 39(m). The activation of the virtual server in the server 39(m) triggers a notification to the policy agent 400 in that server 39(m). At 412, the policy agent 400 in server 39(m) requests a policy from the POD service rendering engine 300. Again, the activation of the virtual machine 35 is in response to a policy-based cloud service request for establishing a virtual data center, but the activation of the virtual machine 35 occurs some time after receipt of the policy-based cloud service request. The cloud service request may still be received at a service rendering engine at any hierarchical level.

In response to receiving the policy request from the policy agent 400 in the server 39(m) where the virtual machine 35 went active, the POD service rendering engine 300 makes a placement decision, determining which cloud elements within the POD domain should be used to establish the requested virtual data center. In this case, the POD service rendering engine 300 selects a load balancer 46 and an access switch 38(2).

At 320(1) and 320(2), the POD service rendering engine communicates with the abstract device brokers 400 for all selected cloud elements within the POD domain, e.g., load balancer 36 and access switch 38(2), in order to provide each such cloud element with the applicable policy subset for rendering and provisioning. At 322(1) and 322(2), the abstract device brokers 400 within the POD domain acknowledge receipt of the policy subsets to the POD service rendering engine.

At 330, the POD service rendering engine 300 provides the applicable policy subset to the policy agent 400 that triggered POD rendering and provisioning.

At 340, the POD service rendering engine 300 triggers the data center service rendering engine 200. Referring now to FIG. 10, the data center service rendering engine 200 makes a placement decision, determining which cloud elements within the data center domain should be used to establish the requested virtual data center. In this example, the data center service rendering engine 200 selects a data center edge switch 22(1) to provide connectivity to the virtual data center being established, and selects a firewall device 24 hanging off that data center edge switch 22(1).

At 230(1) and 230(2), the data center service rendering engine 200 communicates with the abstract device brokers for all selected cloud elements within the data center domain in order to provide each such cloud element with the applicable policy subset for rendering and provisioning. At 232(1) and 232(2), the abstract device brokers 400 within the data center domain acknowledge receipt of the policy subsets to the data center service rendering engine 200.

At 240, the data center service rendering engine 200 sends an acknowledgement in response to the initial policy-based cloud service request.

In one implementation, operations 320(1)-320(3) and operations 230(1) and 230(2) involve a handshake rather than a unidirectional message containing the applicable policy subset.

Figure 11:
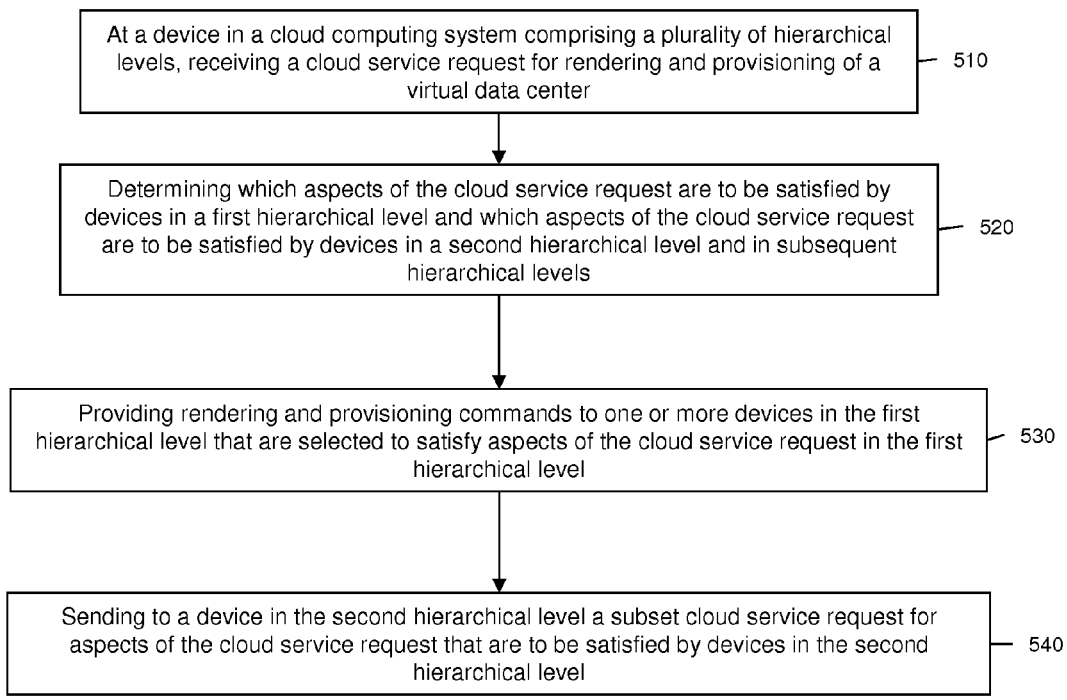
FIG. 11 is an example of a generalized flow chart depicting operations performed by a service rendering engine when it receives a cloud service request.

Reference is now made to FIG. 11. FIG. 11 shows a flow chart that depicts operations of any of the service rendering engines 100, 200 or 300, and applies generally to a "top down" flow of FIGS. 7 and 8 or a "bottom down" flow of FIGS. 9 and 10. Moreover, the operations of the flow chart shown in FIG. 11 begin when a service rendering engine receives a cloud service request, and again, the service rendering engine may be in any of a plurality of hierarchical levels in a cloud computing system. In FIG. 11 and the following description thereof, the service rendering engine that receives the cloud service request is referred to as a "first" service rendering engine in a first hierarchical level, which is completely arbitrary and could refer to a service rendering engine in any of the plurality of hierarchical levels. Likewise, the "second" service rendering engine referred in FIG. 11 and the following description is in a second hierarchical level, which is completely arbitrary. The second hierarchical level may be the next "lower" hierarchical level with respect to the first hierarchical level. For example, the first hierarchical level is the data center level 20 and the second hierarchical level is the POD level 30. On the other hand, the second hierarchical level may be the next "higher" hierarchical level with respect to the first hierarchical level. For example, the first hierarchical level is the POD level 30 and the second hierarchical level is the data center level 20. The operations shown in FIG. 11 assumes that there is at least one service rendering engine in each of a plurality of hierarchical levels of a cloud computing system, where each service rendering engine is configured to make placement decisions, render and provision cloud elements in a given hierarchical level.

At 510, at a device in a cloud computing system comprising a plurality of hierarchical levels, receiving a cloud service request for rendering and provisioning of a virtual data center. For example, at a device that executes a first service rendering engine in a device in a first hierarchical level, a cloud service request for rendering and provisioning of a virtual data center is received. In one example, the cloud service request may be received from an outside entity, e.g., NMS 50 (FIG. 1). In another example, such as the "bottom up flow" described above in connection with FIGS. 9 and 10, the first service rendering engine receives a policy request sent by a policy agent in a server or from a (virtual) switch to which the server's virtual port connects to in which a virtual machine went active (in a delayed response to an outside cloud service request).

At 520, a determination is made as to which aspects of the cloud service request are to be satisfied by devices in a first hierarchical level and which aspects of the cloud service request are to be satisfied by devices in a second hierarchical level and in subsequent hierarchical levels. For example, the first service rendering engine determines which aspects of the cloud service request are to be satisfied by cloud elements (devices) in the first hierarchical level and which aspects of the cloud service request are to be satisfied by cloud elements (devices) in a second hierarchical level and in subsequent (other) hierarchical levels (either up or down in the hierarchy). When the first service rendering engine determines at 520 which aspects of the cloud service request are to be satisfied by devices in the second hierarchical level it does so without knowledge of details of placement, rendering and provisioning of devices in the second hierarchical level. In the case of the "bottom up" flow described above in connection with FIGS. 9 and 10, the determining operation at 520 is based on a policy request received from a policy agent in a server device in the first hierarchical level in which a virtual machine went active in delayed response to the cloud service request.

At 530, rendering and provisioning commands are provided to one or more devices in the first hierarchical level that are selected to satisfy aspects of the cloud service request in the first hierarchical level. For example, the first service rendering engine provides rendering and provisioning commands to one or more devices in the first hierarchical level that are selected by the first service rendering engine to satisfy aspects of the cloud service request in the first hierarchical level.

At 540, a subset cloud service request is sent to a device in the second hierarchical level for aspects of the cloud service request that are to be satisfied by devices in the second hierarchical level. For example, the first service rendering engine sends a subset cloud service request for aspects of the cloud service request that are to be satisfied by devices in the second hierarchical level to a second service rendering engine in a device in the second hierarchical level. As explained above, in one example the subset cloud service request is a forwarded version of the original cloud service request that has been filtered or otherwise portions of which are marked to indicate those aspects to be rendered by the second service rendering engine.

In sum, a mechanism is provided for distributed hierarchical rendering and provisioning of policy-based cloud service requests within and between data centers. Cloud service requests are satisfied by following the hierarchy in a top down or bottom up fashion, with a service rendering engine at each layer of the hierarchy responsible for placement, rendering, and provisioning at that level, then handing off to the next lower or higher level service rendering engine. Service rendering engines hand off subsets of the policy-based cloud service request to abstract device brokers resident on each cloud element for rendering and provisioning within each of those could elements. Each service rendering engine need only be capable of configuring and interfacing with cloud elements in its own processing domain of its hierarchical level and with the service rendering engines of its adjacent hierarchical levels.

The hierarchical and distributed control plane techniques describe herein provides vastly improved scalability. These techniques are useful for Cloud-Centric Networking (CCN) computing environments comprising numerous data centers with hundreds of thousands of servers per data center. Although one implementation involves three levels of hierarchy as described herein (POD level, data center level, and network level), these techniques may be employed for an arbitrary number of hierarchical levels, allowing customers to control the tradeoff between accuracy and scalability. These techniques render and provision policy on individual cloud elements by passing subsets of the policy-based cloud service request to abstract device brokers resident on each cloud element. This significantly simplifies service rendering engines and network management functionality by offloading policy transformation into various configuration interfaces and models, eliminating long implementation time lags between availability of new capabilities at network elements, and the ability of service rendering engines and network management stations to provision those new capabilities. Moreover, these techniques significantly reduce operational complexity by reducing the multiplicity of management interfaces and models required to render and provision cloud services.

The distributed hierarchical cloud services rendering and provisioning techniques described herein may be embodied in a method, an apparatus comprising a network interface unit and a processor configured to perform operations described herein, and/or computer-readable medium storing instructions that, when executed cause a processor to perform operations described herein.

The techniques described herein may be applied to failure management and disaster recovery to automatically relocate services from failed devices/PODs/Data Centers. When a device in one of the plurality of hierarchical levels fails or otherwise become inoperable, a determination is made as to whether there are one or more other available devices within that hierarchical level to satisfy the operations of the failed device and if so rendering and provisioning commands are provided to those one or more other devices. Otherwise, a cloud service request is sent to a device in another hierarchical level (e.g., in a next higher or next lower level) which determines whether there are one or more available devices in that hierarchical level to satisfy the operations of the failed device.

The techniques described herein may be in various forms, including a method, apparatus and computer-readable memory medium. In the latter case, instructions are stored in a tangible computer-readable memory medium (e.g., a memory device), which instructions are operable (or cause a processor, when executed) to: at a device in a cloud computing system comprising a plurality of hierarchical levels, receive a cloud service request for rendering and provisioning of a virtual data center; determine which aspects of the cloud service request are to be satisfied by devices in the first hierarchical level and which aspects of the cloud service request are to be satisfied by devices in a second hierarchical level and in subsequent hierarchical levels; provide rendering and provisioning commands to one or more devices in the first hierarchical level that are selected to satisfy aspects of the cloud service request in the first hierarchical level; and send to a device in the second hierarchical level a subset cloud service request for aspects of the cloud service request that are to be satisfied by devices in the second hierarchical level.

In apparatus form, an apparatus is provided that comprises a network interface unit configured to perform communications over a network; and a processor configured to be coupled to the network interface unit. The processor is configured to: receive a cloud service request for rendering and provisioning of a virtual data center in a cloud computing system comprising a plurality of hierarchical levels; determine which aspects of the cloud service request are to be satisfied by devices in a first hierarchical level and which aspects of the cloud service request are to be satisfied by devices in a second hierarchical level and in subsequent hierarchical levels; provide rendering and provisioning commands to one or more devices in the first hierarchical level that are selected to satisfy aspects of the cloud service request in the first hierarchical level; and send to a device in the second hierarchical level a subset cloud service request for aspects of the cloud service request that are to be satisfied by devices in the second hierarchical level.

In addition, localized rendering of a cloud element may be embodied in an apparatus comprising a network interface unit configured to perform communications over a network; a processor configured to be coupled to the network interface unit. The processor is configured to: receive a rendering and provisioning information associated with a cloud service request in a cloud computing system; and convert the rendering and provisioning information into internal configuration information to perform one or more functions associated with the cloud service request.

The above description is intended by way of example only. What is claimed is:

1. A method comprising:
   at a device in a cloud computing system comprising a plurality of hierarchical levels, receiving a cloud service request for rendering and provisioning of a virtual data center;
   determining which aspects of the cloud service request are to be satisfied by devices in a first hierarchical level and which aspects of the cloud service request are to be satisfied by devices in a second hierarchical level and in subsequent hierarchical levels;
   providing rendering and provisioning commands to one or more devices in the first hierarchical level that are selected to satisfy aspects of the cloud service request in the first hierarchical level; and
   sending to a device in the second hierarchical level a subset cloud service request for aspects of the cloud service request that are to be satisfied by devices in the second hierarchical level when the devices in the first hierarchical level cannot satisfy aspects of the cloud service request.

2. The method of claim 1, and further comprising selecting one of a plurality of processing domains in the second hierarchical level for aspects of the cloud service request that are to be satisfied by devices in the second hierarchical level, and wherein sending comprises sending the subset cloud service request to a device in the selected processing domain of the second hierarchical level.

3. The method of claim 1, wherein providing rendering and provisioning commands comprises providing rendering and provisioning subset information derived from the received cloud service request to one or more selected devices in the first hierarchical level.

4. The method of claim 1, and further comprising at one or more devices in the first hierarchical level, converting the rendering and provisioning commands into an internal configuration to perform one or more functions.

5. The method of claim 1, and further comprising at the device in second hierarchical level, selecting one or more devices in the second hierarchical level to satisfy the subset cloud service request and providing rendering and provisioning commands to the one or more selected devices in the second hierarchical level.

6. The method of claim 1, wherein determining comprises determining which aspects of the cloud service request are to be satisfied by devices in the second hierarchical level without knowledge of details of placement, rendering and provisioning of devices in the second hierarchical level.

7. The method of claim 1, wherein determining is based on a policy request received from a server device in the first hierarchical level in which a virtual machine went active in response to the cloud service request.

8. The method of claim 1, wherein the second hierarchical level is a lower hierarchical level with respect to the first hierarchical level.

9. The method of claim 1, wherein the second hierarchical level is a higher hierarchical level with respect to the first hierarchical level.

10. The method of claim 1, wherein when a device in one of the plurality of hierarchical levels fails or otherwise become inoperable, further comprising determining whether there are one or more other available devices within said one of the plurality of hierarchical levels to satisfy operations of the failed device and if so providing rendering and provisioning commands to said one or more other devices, and otherwise sending a cloud service request to a device in another hierarchical level which determines whether there are one or more available devices in said another hierarchical level to satisfy the operations of the failed device.

11. The method of claim 1, wherein determining is based on normalized information representing capabilities of devices in the first hierarchical level and in the second hierarchical level.

12. A non-transitory computer-readable memory medium storing instructions that, when executed by a processor, cause the processor to:
   at a device in a cloud computing system comprising a plurality of hierarchical levels, receive a cloud service request for rendering and provisioning of a virtual data center;
   determine which aspects of the cloud service request are to be satisfied by devices in the first hierarchical level and which aspects of the cloud service request are to be satisfied by devices in a second hierarchical level and in subsequent hierarchical levels;
   provide rendering and provisioning commands to one or more devices in the first hierarchical level that are selected to satisfy aspects of the cloud service request in the first hierarchical level; and
   send to a device in the second hierarchical level a subset cloud service request for aspects of the cloud service request that are to be satisfied by devices in the second hierarchical level when the devices in the first hierarchical level cannot satisfy aspects of the cloud service request.

13. The computer-readable memory medium of claim 12, wherein the instructions that cause the processor to provide rendering and provisioning commands comprise instructions that cause the processor to provide corresponding rendering and provisioning subset information derived from the received cloud service request to one or more selected devices in the first hierarchical level.

14. The computer-readable memory medium of claim 12, and further comprising instructions that, when executed by the processor, cause the processor to select one of a plurality of processing domains in the second hierarchical level for aspects of the cloud service request that are to be satisfied by devices in the second hierarchical level.

15. The computer-readable memory medium of claim 12, wherein the instructions that cause the processor to determine are configured to cause the processor to determine which aspects of the cloud service request are to be satisfied by devices in the second hierarchical level without knowledge of details of placement, rendering and provisioning of devices in the second hierarchical level.

16. An apparatus comprising:
   a network interface unit configured to perform communications over a network;
   a processor configured to be coupled to the network interface unit, wherein the processor is configured to:
     receive a cloud service request for rendering and provisioning of a virtual data center in a cloud computing system comprising a plurality of hierarchical levels;
     determine which aspects of the cloud service request are to be satisfied by devices in a first hierarchical level and which aspects of the cloud service request are to be satisfied by devices in a second hierarchical level and in subsequent hierarchical levels;
     provide rendering and provisioning commands to one or more devices in the first hierarchical level that are selected to satisfy aspects of the cloud service request in the first hierarchical level; and send to a device in the second hierarchical level a subset cloud service request for aspects of the cloud service request that are to be satisfied by devices in the second hierarchical level when the devices in the first hierarchical level cannot satisfy aspects of the cloud service request.

17. The apparatus of claim 16, wherein the processor is configured to provide rendering and provisioning commands by providing rendering and provisioning subset information derived from the received cloud service request to the one or more selected devices in the first hierarchical level.

18. The apparatus of claim 16, wherein the processor is further configured to select one of a plurality of processing domains in the second hierarchical level for aspects of the cloud service request that are to be satisfied by devices in the second hierarchical level.

19. The apparatus of claim 16, wherein the processor is configured to determine which aspects of the cloud service request are to be satisfied by devices in the second hierarchical level without knowledge of details of placement, rendering and provisioning of devices in the second hierarchical level.

20. The apparatus of claim 16, wherein the processor is further configured to determine which aspects of the cloud service request are to be satisfied by devices in the first hierarchical level and which aspects of the cloud service request are to be satisfied by devices in the second hierarchical level and in the subsequent hierarchical levels based on a policy request received from a server device in the first hierarchical level in which a virtual machine went active in response to the cloud service request.

21. The apparatus of claim 16, wherein when a device in one of the plurality of hierarchical levels fails or otherwise becomes inoperable, determine whether there are one or more other available devices within said one of the plurality of hierarchical levels to satisfy operations of the failed device and if so provide rendering and provisioning commands to said one or more other device, and otherwise send a cloud service request to a device in another hierarchical level which determines whether there are one or more available devices in said another hierarchical level to satisfy the operations of the failed device.

22. The apparatus of claim 16, wherein the processor is further configured to determine which aspects of the cloud service request are to be satisfied by devices in the first hierarchical level and which aspects of the cloud service request are to be satisfied by devices in the second hierarchical level and in the subsequent hierarchical levels based on normalized information representing capabilities of devices in the first hierarchical level and in the second hierarchical level.

* * * * *